United States Patent [19]

Hiscock

[11] 4,411,206

[45] Oct. 25, 1983

[54] PRECISION SOWER

[75] Inventor: Donald C. Hiscock, Rotorua, New Zealand

[73] Assignee: Development Finance Corp of New Zealand, Wellington, New Zealand

[21] Appl. No.: 284,813

[22] Filed: Jul. 20, 1981

[51] Int. Cl.³ .............................................. A01C 7/04
[52] U.S. Cl. ........................................ 111/34; 111/91
[58] Field of Search ....................... 111/34, 89, 59, 90, 111/91, 192

[56] References Cited

U.S. PATENT DOCUMENTS

| | | | |
|---|---|---|---|
| 491,994 | 2/1893 | Erickson | 111/90 |
| 1,762,671 | 6/1930 | Slathar | 111/34 X |
| 2,543,888 | 3/1951 | Bunch | 111/91 |
| 4,145,980 | 3/1979 | Boots | 111/34 X |
| 4,148,362 | 4/1979 | Orth | 111/89 X |
| 4,261,270 | 4/1981 | Nichols | 111/89 |
| 4,306,509 | 12/1981 | Hassan et al. | 111/34 |

FOREIGN PATENT DOCUMENTS

| | | | |
|---|---|---|---|
| 101052 | 9/1925 | Austria | 111/91 |
| 582953 | 12/1946 | United Kingdom | 111/34 |
| 676186 | 7/1952 | United Kingdom | 111/34 |
| 444514 | 11/1974 | U.S.S.R. | 111/89 |
| 533349 | 11/1976 | U.S.S.R. | 111/89 |

Primary Examiner—James R. Feyrer
Attorney, Agent, or Firm—Armstrong, Nikaido, Marmelstein & Kubovcik

[57] ABSTRACT

A precision sower is described which has the capability of sowing seeds in single in rows parallel to the direction of travel of the sower and in parallel rows normal to the direction of travel. The sower cimprises a hollow rotatable drum provided with series radial holes, each series being in the same plane, and an internal source of vacuum. Pins positively displace seeds from the holes at a predetermined point in the rotation of the drum. The pins are actuated by a cam surface during normal rotation of the drum. The sower can be used in association with rollers, coulters and other implements to assist in the sowing operation.

7 Claims, 5 Drawing Figures

PRECISION SOWER

BACKGROUND TO THE INVENTION

1. Field of Invention

This invention relates to a precision sower. More particularly it relates to a precision sower which has the capability of sowing seeds in rows parallel to the direction of travel of the sower as well as parallel rows perpendicular to the direction of travel.

2. Discussion of the Prior Art

Precision sowers are used primarily for sowing seeds in seed beds. It will be appreciated that in order to achieve optimum use of such seed beds seeds should be sown singularly and in rows whereby they are aligned parallel to one another, both longitudinally and laterally.

It is an object of this invention to go some way towards achieving this desideratum or at least to offer the public a useful choice.

SUMMARY OF THE INVENTION

Accordingly the invention may be said broadly to consist in a precision seed sowing apparatus comprising a rotatable drum mounted in use to roll over soil in which seeds are sown, regularly spaced orifices passing through the circumference of said drum, each said orifice lying in a common plane perpendicular to the axis of the said drum, means for receiving a source of vacuum in the interior of said drum whereby the pressure at the radially interior end of said orifices is lower than that at the exterior end, seed feeding means exterior to said drum and co-operable with said orifices, seed discharging means co-operable with said orifices, the arrangement being such that in use said seed feeding means feeds seeds to said orifices where they are held by a vacuum applied to said means for receiving a vacuum and said discharging means release said seeds at a predetermined point in the rotation of said drum directly into the soil as said drum rolls thereover.

Preferably there are provided a plurality of said rows of regularly spaced orifices, each of said rows being spaced at a predetermined spacing from the others.

Preferably said seed feeding means comprises a hopper whose outlet is in registry with each said row of orifices.

Preferably said hopper is mounted adjacent said drum so that said orifices rotate past said hopper orifice from the bottom to the top thereof.

Preferably said seed discharge means comprises a series of pins, each said pin being rotatable with said drum in registry with a said orifice.

Preferably said pins are mounted on a series of bars radially movable within guideways within said drum.

Preferably the interior ends of each of said orifices are countersunk interiorly.

Preferably said bars are actuated by a cam.

Preferably said means for receiving a source of vacuum is connected to the intake manifold of the engine of the primary mover or a separate vacuum pump.

Preferably there are provided a set of raking fingers co-operable with each said row of orifices arranged so as to dislodge into said seed feeding means more than one seed when more than one seed is engaged by a said orifice.

Preferably said sowing apparatus is arranged in combination with a trailing soil replacing and compacting means.

Preferably said soil replacing means comprises a flexible dragging member.

Preferably said soil compacting means comprises a compaction wheel trailing behind said flexible soil replacement member.

Preferably said rotatable drum is preceeded by a coulter positioned to dig a sowing trench into which said seeds are deposited.

Preferably said coulter is preceeded by a bed preparing means.

Preferably said bed preparing means comprises a rotary hoe followed by a bed compacting drum.

Preferably there is provided a secondary compacting, sowing and depth control drum trailing said compacting drum.

Preferably said rotary hoe is preceeded by a pair of winged ploughs, which ploughs define the edges of the bed to be planted.

Preferably said rotary hoe is preceeded by a depth regulating drum.

The invention consists in the foregoing and also envisages constructions of which the following gives examples.

BRIEF DESCRIPTION OF THE DRAWINGS

The invention may be more fully understood by having reference to FIGS. 1 to 5 of the accompanying drawings wherein.

DETAILED DESCRIPTION OF THE PREFERRED EMBODIMENT

Figure 1:
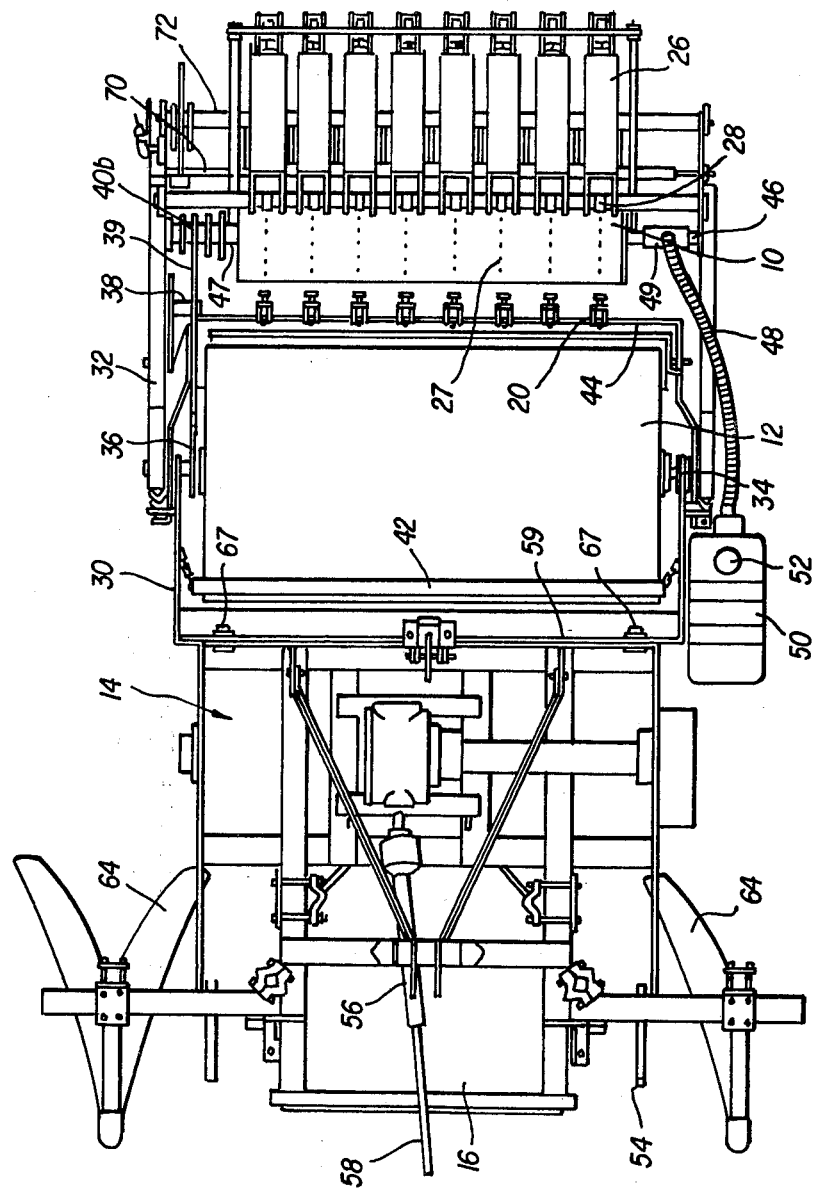
FIG. 1 is a top plan view of the preferred embodiment of the invention.
Figure 2:
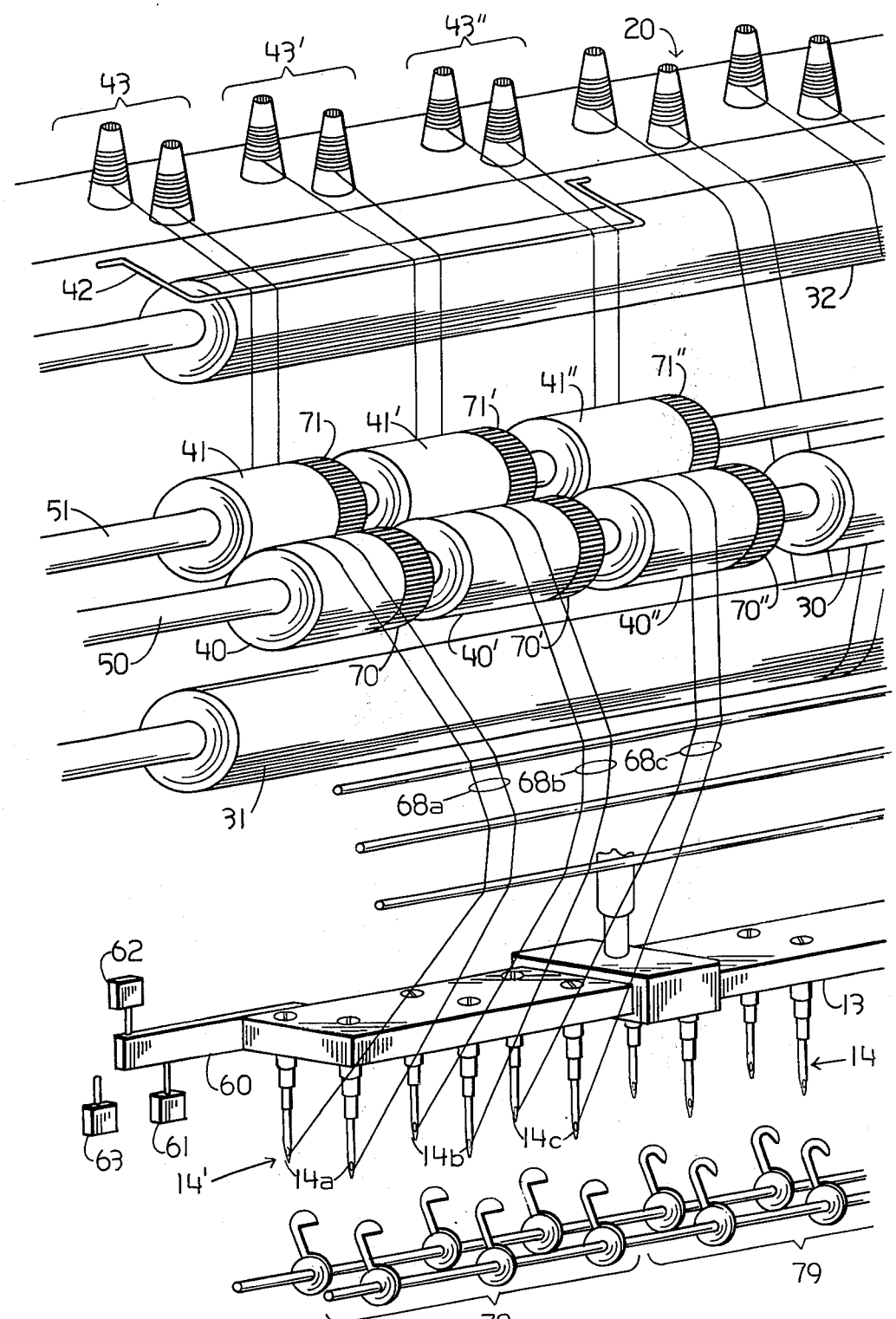
FIG. 2 is a side elevation of the embodiment illustrated in FIG. 1.

The main sowing drum 10 is constructed of any convenient material. In a preferred embodiment it is constructed of a PVC piping of suitable diameter. Drum 10 is preceeded by a primary compacting roller 12 constructed of relatively thin plate steel. Roller 12 is preceeded by a rotary hoe 14 of a conventional type. A depth setting roller 16 is provided toward the front part of the apparatus. A secondary compacting roller 18 trails the main compacting roller 12. A series of eight coulters 20 are mounted on a frame member trailing secondary compacting roller 18. A series of soil filling flaps 22 are aligned with the coulters 20 so as to redeposit soil into the trench dug by coulters 20 in a manner described herein below. A series of compacting wheels 24 are also provided.

A series of eight hoppers 26 are aligned with rows of orifices through the circumference of drum 10. Raker teeth 28 are provided to be positioned against each of the rows 27 to dislodge seeds when more than one seed is engaged by an orifice in a manner to be described. The hoppers are positioned on an upward portion of the path of travel of orifices 94 for a reason set out below in the description of the operation of the apparatus.

A forward side frame member 30 is bolted with bolts 67 to the back of the rotary hoe frame. A rearward side frame member 32 is pivotable about axle 34 so that the rearward portion of the apparatus can be pivotted to a position above roller 12 when the apparatus is not in use but is being carried behind a tractor.

Roller 12 rotates on a pair of stub axles 34 mounted in frame members 30 on either side thereof. A drive sprocket 36 is provided on one of the stub axles. An idler sprocket 38 is provided on an adjustable flange to provide for sufficient tension in driving chain 39 which passes over sprocket 40B to rotate drum 10 in a manner to be described below.

Figure 3:
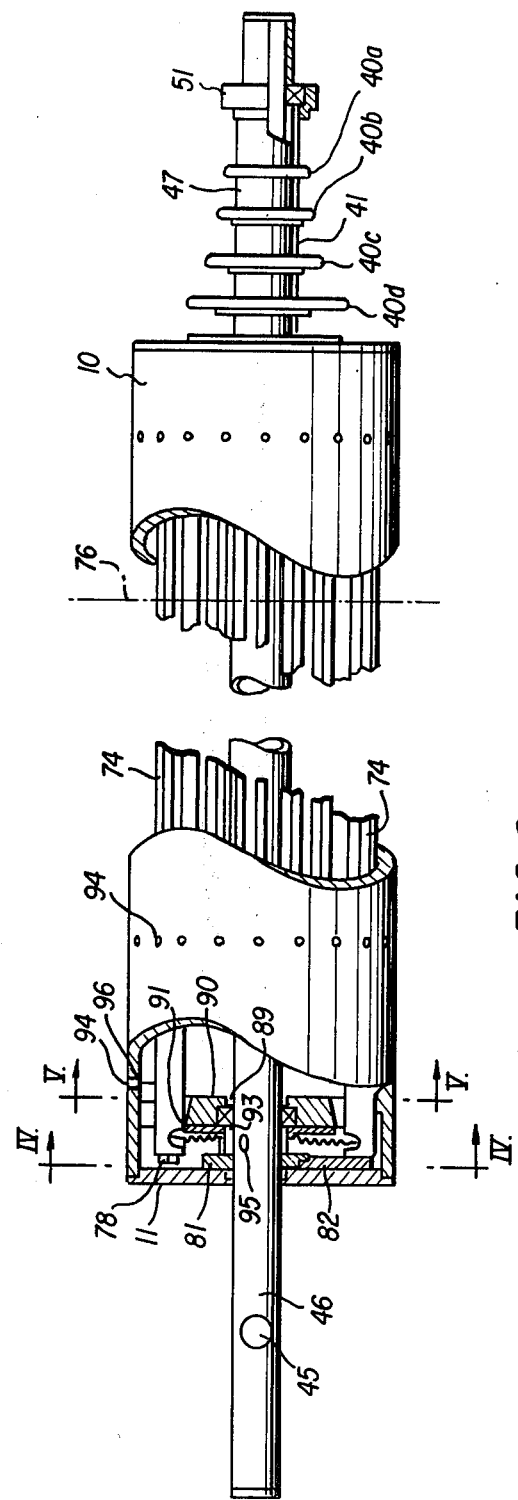
FIG. 3 is a rear elevation, partly broken away of the sowing drum.

Referring to FIG. 3 a series of sprockets 40A, 40B, 40C and 40D are provided over a sleeve 47 and are keyed by a key 41. Sleeve 47 is mounted in one end in bearing 51 which is self mounted to frame member 32. Shaft 46 is hollow and non-rotatable. An orifice 45 is provided into the hollow centre of shaft 46. A collar 49 is fitted over shaft 46 with a hole in alignment with hole 45 and a flexible hose 48 leading to an air filter. A further orifice 52 leads from the air filter via a flexible hose (not shown) to the air intake of the prime mover, usually a tractor.

The device is mounted on a tractor through the usual three point linkage arrangement. A lower linkage point 54 and upper linkage point 56 are provided. The rotary hoe is driven by power take off shaft 58 through normal gearing. The portion of the apparatus from flange 59 rearward can be used without the rotary hoe preceeding it and this portion of the apparatus is also provided with an upper linkage point 66 and lower linkage point 68. The height of the rear portion relative to the front portion can be adjusted by a crank 60 after loosening nuts 67. Interior plough wings 64 are provided to dig up the soil compacted by the tractor wheels preceeding the apparatus and feed it inside plates 65 of the rotary hoe. Blades 62 are also provided to assist in directing soil of the bed interiorly.

Flaps 22 are mounted on shaft 70 which is pivotal with a lever on the upper side frame member 32 as seen in FIG. 1. Compacting wheels 24 are mounted via spring arms onto a shaft 72 which is also pivotal by means of a crank attached to a screw cranking mechanism on the outer end of shaft 72.

Scraper bar 42 is provided to scrap soil stuck to roller 12 therefrom while bar 44 serves the same function with roller 18. Referring to FIG. 3 each of the rows 27 comprises orifices 94 which are countersunk at 96 to the interior thereof. A series of aluminum bars 74 which are parallel to the axis of the drum are provided with pins 76 which are aligned with each of the orifices 94. A disc 90 may be made out of a suitable material which allows for the sliding of the aluminum bars. Such a material may be plywood or other suitable material such as tetrafluoroethylene or nylon. It could also be constructed of metal lined with some such suitable material.

A series of radially extending guide ways 92 are provided in disc 90. Bars 74 slide in these guide ways 92. At either end of each of the aluminum bars 74 there is provided a small rotatable wheel 78. Inward of the wheels 78 at each end are provided springs 80 on flanges 91, the springs and flanges being rotatable with the discs about bearing 89 which is mounted on hollow shaft 46. A cam holder 81 is fixed to shaft 46. A cam 82 is mounted in cam holder 81. The leading surface 84 is in the line of travel of each of the wheels 78 and operates in a manner to be described below. The returning cam surface 86 dictates the path of travel of wheels 78. A returning member 88 is provided to return wheels 78 and hence bars 74 to their retracted position in the event that the spring is not sufficient to overcome sticking of pins 76 in orifices 94.

A collar 93 is provided and clamped onto shaft 46. An orifice 95 is provided through the collar to allow sufficient vacuum to have access to the passageway inside of end cap 11 of drum 10 to remove any soil which has accumulated there.

In operation in the optimum mode a seedling bed is prepared in the usual fashion. The apparatus is mounted behind a tractor and positioned at the beginning of the bed. The three point linkage top link is raised or lowered so as to level the different portions of the apparatus to a predetermined optimum sowing arrangement. Hoppers 26 are filled with the desired seed, in the preferred embodiment the seed being from *Pinus radiata*.

Because the hoppers are positioned on the upward portion of the rotation of the orifices 94 there is no need to have a controlled passage out of the hopper to permit only one seed at a time to be taken out of the hopper. If the orifices were on the downward side of the drum it would be difficult to allow for the of only one seed at a time past the downward most lip of the hopper.

As the tractor advances along the raised seed bed the inner wings 64 of the plough direct soil from the track of the wheels inboard of the plates 65 of the rotary hoe. Blades 62 direct soil compacted by roller 16 inwardly. The rotary hoe is set to a shallow depth so as to merely stir up the soil. This stirring effect equalises the moisture content of the soil at a depth allowing for optimum sowing conditions. The leading compacting roller 12, which bears the bulk of the weight of the apparatus, serves to compact the soil. Scraper bar 42 tends to remove any excess soil which attaches itself to the roller. Secondary roller 18 is provided to compact irregularities which might have been formed by the heavier weight of roller 12 so as to achieve an optimum depth surface. Coulters 20 are adjustable to set a depth which is predetermined by the type of seed which is to be planted. Hoppers 26 feed seeds to the orifices 94 in roller 10 which rotates and deposits the seeds just before the bottom point of the rotation of the drum 10. This function will be more particularly described herein below. Flap 22 is provided to push soil back into the trench cut by the coulter 20. Compacting wheel 24 compacts the soil pushed back into the trench by flap 22. It is preferred to bury the seeds by this two step method as a filling and compacting single step has a tendancy to both bring seeds toward the surface and to move them out of the precision spacing provided for by the drum.

Figure 5:
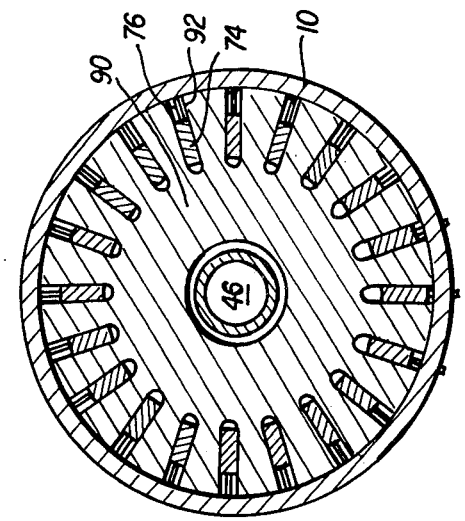
FIG. 5 is the sectional view V—V shown in FIG. 3.

The operation of the drum will now be described in relation to FIGS. 3 to 5. Drum 10 rotates in a counter clockwise direction when viewed from the left hand end shown in FIG. 3. When bars 74 are not in contact with the cam surfaces 84 and 86 they are normally retracted by springs 80 radially inward in guideways 92. Pins 76 are thus withdrawn from orifices 94 although they still remain slightly within the countersunk portions 96. As the rotation of drum 10 continues so that roller 78 comes into contact with cam surface 84 pin 76A begins to enter its orifice. Pins 76B, 76C and 76D are fully extended through their corresponding orifices. Retracter cam surface 88 is provided in the event that a pin becomes lodged in a corresponding orifice and bar 74 is not retracted by springs 80.

Figure 4:
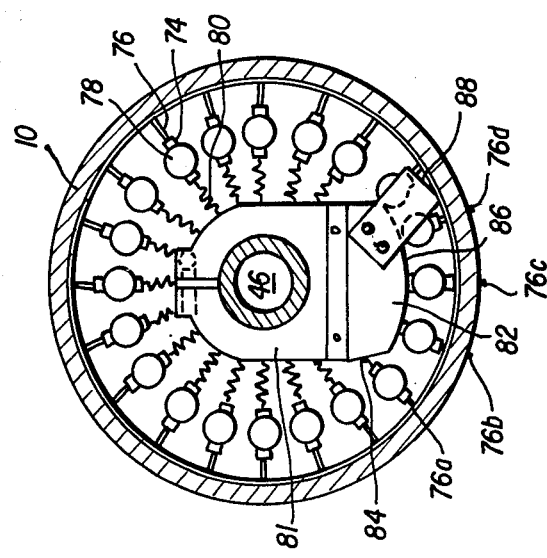
FIG. 4 is the sectional view IV—IV of FIG. 3.

Seeds from hopper 26 are picked up by orifices in the region of retractor 88 and passed by the raker teeth at approximately 3 o'clock as seen in FIG. 4. Single seeds are then rotated through the remainder of the circumference until they reach a position between pins 76A and 76B where the pin pushing through the orifice 94 discharges the seeds directly into the soil. It will be seen that by providing cams 84 and 86 the point of discharge in the rotation remains the same.

The vacuum for the orifices 94 is provided by orifices through the central shaft 46 which create a partial vacuum within drum 10. Pressure is reduced to approximately one half atmospheric by the intake of a prime mover such as a tractor.

The spacing of the seed placements longitudinally along a bed may be varied by changing the drive chain 39 to be over any one of sprockets 40A, 40B, 40C or 40D. To space the distance between the rows 27 it would, of course, be necessary to change a drum but in a normal nursery this would not occur very often. If a bed does not need to be mixed and compacted then the rotary hoe portion of the apparatus can be dispensed with. Similarly drum 12 may be replaced by a pair of land wheels.

The apparatus described has been used to sow rows of *Pinus radiata* seeds and thus is adapted for optimum spacing of such seeds. However it will be appreciated by those skilled in the art that with minor adaptions other seeds can be sown in beds with the same form of apparatus.

What is claimed is:

1. A precision seed sowing apparatus comprising:
   a rotatable drum mounted in use to roll over roll in which seeds are to be sown,
   regularly spaced orifices passing through the circumference of said drum, each said orifice lying in a common plane perpendicular to the axis of said drum,
   means for receiving a source of vacuum in the interior of said drum whereby the pressure at the radially interior end of said orifices is lower than at the exterior end,
   seed feeding means exterior to said drum and cooperable with said orifices,
   seed discharging means cooperable with said orifices, said discharging means comprising:
   pins, each of which is aligned with a said orifice, said pins being mounted on bar members, each said bar member being substantially parallel with the longitudinal axis of said drum,
   a pair of disc members each having a plurality of radial guideways, one disc member being adjacent each end of said drum, each of said bar members being slideable radially inwardly and outwardly within each said guideway, said discs and bars being rotatable with said drum,
   biasing means biasing each said bar inwardly so that at rest each said pin is positioned radially inward from its corresponding orifice, and,
   cam means fixed relative to said drum and having a first striking surface and a second striking surface in the path of travel of a striking surface of each said bar, the first striking surface being positioned so that contact with the striking surface of said bar advances said bar against said biasing means directly radially outwardly whereby the row of pins on said advanced bar passes through the aligned row of orifices to dislodge seeds along said row of orifices, said first cam surface being positioned to advance said bar at or near the bottom-most point of rotation of said drum, said second striking surface being positioned so that contact is maintained with the striking surface of said bar after it has passed said first striking surface to maintain said row of pins on said bar within said orifices until said row of orifices has rotated clear of said soil over which the drum is travelling, said biasing means returning each said bar to its rest position after its striking surface has passed said second cam striking surface.

2. An apparatus as claimed in claim 1 wherein there are provided a plurality of said rows of regularly spaced orifices, each of said rows being spaced at a predetermined spacing from the others.

3. An apparatus as claimed in claim 2 wherein said seed feeding means comprises a hopper whose outlet is in registry with each said row of orifices.

4. An apparatus as claimed in claim 3 wherein said hopper is mounted adjacent said drum so that said orifices rotate past said hopper orifice from the bottom to the top thereof.

5. An apparatus as claimed in claim 1 wherein said means for receiving a source of vacuum is connected to a separate vacuum pump.

6. An apparatus as claimed in claim 1 wherein said sowing apparatus is arranged in combination with a trailing soil replacing and compacting means.

7. Apparatus according to claim 1 wherein there are provided a pair of said cam means, one toward each end of said drum.

* * * * *